United States Patent
Moe

(10) Patent No.: US 11,999,488 B2
(45) Date of Patent: Jun. 4, 2024

(54) ADAPTER PLATE FOR AN AIRCRAFT SEAT

(71) Applicant: B/E Aerospace, Inc., Winston-Salem, NC (US)

(72) Inventor: Daniel N. Moe, Mukilteo, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 79 days.

(21) Appl. No.: 17/959,874

(22) Filed: Oct. 4, 2022

(65) Prior Publication Data
US 2023/0027770 A1   Jan. 26, 2023

Related U.S. Application Data

(62) Division of application No. 16/741,540, filed on Jan. 13, 2020, now Pat. No. 11,492,122.

(51) Int. Cl.
*B64D 11/06* (2006.01)

(52) U.S. Cl.
CPC ...... *B64D 11/0646* (2014.12); *B64D 11/0606* (2014.12); *B64D 11/0612* (2014.12); *B64D 11/0638* (2014.12)

(58) Field of Classification Search
CPC ............ B64D 11/0646; B64D 11/0606; B64D 11/0612
See application file for complete search history.

(56) References Cited

U.S. PATENT DOCUMENTS

| | | | |
|---|---|---|---|
| 2,947,348 A | 8/1960 | Peckham | |
| 3,175,743 A | 3/1965 | Richard | |
| 4,099,780 A | 7/1978 | Schmidhuber | |
| 4,511,178 A | 4/1985 | Brennan | |
| 5,179,447 A | 1/1993 | Lain | |
| 5,800,013 A | 9/1998 | Branham et al. | |
| 6,260,917 B1 | 7/2001 | Marechal | |
| 6,543,722 B1 | 4/2003 | Parrow et al. | |
| 8,096,502 B2 | 1/2012 | Bock et al. | |
| 8,727,439 B2 | 5/2014 | Herzberg | |
| 8,882,035 B2 | 11/2014 | France et al. | |
| 8,960,602 B2 | 2/2015 | Neumann et al. | |

(Continued)

FOREIGN PATENT DOCUMENTS

| | | |
|---|---|---|
| DE | 102007007573 A1 | 8/2008 |
| EP | 2759447 A2 | 7/2014 |

(Continued)

OTHER PUBLICATIONS

Extended Search Report for European Application No. 21151364.3 dated Jun. 9, 2021, 12 pages.

*Primary Examiner* — Christopher D Hutchens
(74) *Attorney, Agent, or Firm* — Suiter Swantz IP

(57) ABSTRACT

An adapter plate for an aircraft seat may include a body configured to be positioned exterior of an armrest of the aircraft seat within a space proximate to the aircraft seat. The body may include at least one coupler configured to attach to the aircraft seat. The body may include at least one mount point. The at least one mount point of the body may be configured to attach to at least one mount bracket of the removable auxiliary aircraft accessory. The auxiliary aircraft accessory may be positioned within the space proximate to the aircraft seat when coupled to the at least one mount point of the body via the at least one mount bracket.

10 Claims, 18 Drawing Sheets

(56) References Cited

U.S. PATENT DOCUMENTS

| | | |
|---|---|---|
| 9,463,877 B2 | 10/2016 | Ulbrich-Gasparevic et al. |
| 11,492,122 B2 * | 11/2022 | Moe .................. B64D 11/0646 |
| 2001/0024056 A1 | 9/2001 | Romca et al. |
| 2004/0254020 A1 | 12/2004 | Dragusin |
| 2011/0272991 A1 * | 11/2011 | Saxton ............... B64D 11/0646 |
| | | 297/411.46 |
| 2013/0200671 A1 | 8/2013 | Herzberg |
| 2014/0217798 A1 | 8/2014 | Negusse |
| 2014/0300147 A1 | 10/2014 | Suhre et al. |
| 2015/0314713 A1 | 11/2015 | Thomaschewski et al. |
| 2015/0321592 A1 | 11/2015 | Morais |
| 2015/0345778 A1 | 12/2015 | Rubel et al. |
| 2016/0257408 A1 | 9/2016 | Gill et al. |
| 2017/0015224 A1 | 1/2017 | Colsky |
| 2017/0021928 A1 | 1/2017 | Satterfield |
| 2017/0369173 A1 | 12/2017 | Lee et al. |
| 2018/0339775 A1 | 11/2018 | Reyes |
| 2019/0126852 A1 | 5/2019 | Hupperich et al. |
| 2019/0331943 A1 | 10/2019 | Hupperich et al. |
| 2019/0351799 A1 | 11/2019 | Kim et al. |
| 2020/0354063 A1 | 11/2020 | Satterfield |
| 2023/0027770 A1 * | 1/2023 | Moe .................. B64D 11/0627 |

FOREIGN PATENT DOCUMENTS

| | | |
|---|---|---|
| EP | 2944227 A1 | 11/2015 |
| GB | 2407968 A | 5/2005 |
| WO | 9010403 A1 | 9/1990 |
| WO | 2009089167 A1 | 7/2009 |

* cited by examiner

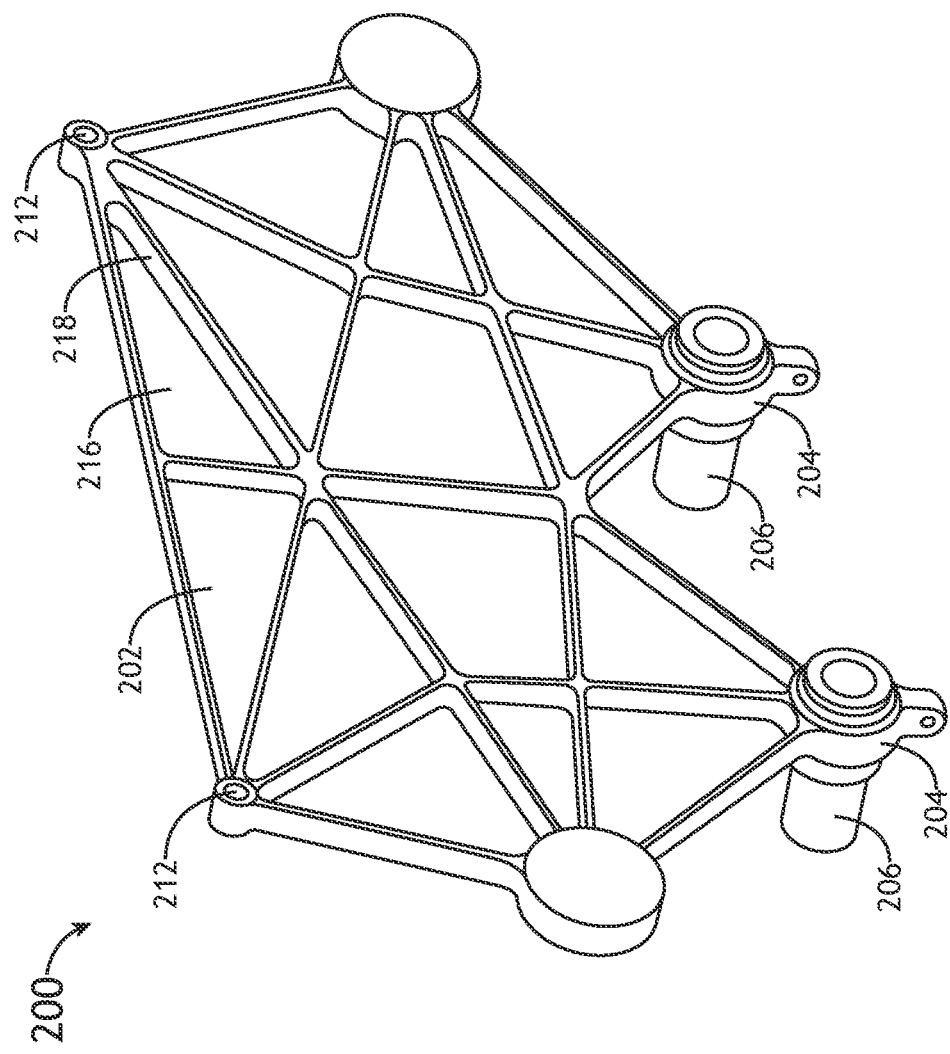

ADAPTER PLATE FOR AN AIRCRAFT SEAT

CROSS-REFERENCE TO RELATED APPLICATION

The present application is a divisional of and claims the benefit of U.S. application Ser. No. 16/741,540, filed Jan. 13, 2020, which is incorporated herein by reference in their entirety.

BACKGROUND

Select aircraft with a cabin including an aft tapered section may require one or more rows of triple seats with an increasingly-narrow width in order to not interfere with an aisle adjacent to the triple seats. The narrow width of the aft rows of triple seats may be undesired by passengers, who may not wish to be subject to the narrow width solely because they are seated in the aft of the aircraft cabin.

In addition, select aircraft include the capability for mounted auxiliary aircraft accessories including, but not limited to, bassinets. The bassinets are typically mounted up near the front of the aircraft and/or on a bulkhead or divider. Mounting the bassinets of the bulkhead or divider may allow for sound to carry through between the divider, potentially interfering with the environment of forward classes.

SUMMARY

An adapter plate for an aircraft seat is disclosed, in accordance with one or more embodiments of the disclosure. The adapter plate may include a body configured to be positioned exterior of an armrest of an aircraft seat within a space proximate to the aircraft seat. The body may include at least one coupler configured to attach to the aircraft seat. The body may include at least one mount point. The at least one mount point of the body may be configured to attach to at least one mount bracket of a removable auxiliary aircraft accessory. The removable auxiliary aircraft accessory may be positioned within a space proximate to the aircraft seat when coupled to the at least one mount point of the body via the at least one mount bracket.

In some embodiments, the at least one coupler may be configured to attach to at least one plug. The at least one plug may be configured to be inserted into at least one spar tube of the aircraft seat.

In some embodiments, at least a portion of an exterior face of the body may include one or more cut-outs and one or more raised sections.

In some embodiments, at least a portion of an exterior face of the body may be smooth.

In some embodiments, the space may be bounded at least in part by the aircraft seat and a sidewall of an aircraft fuselage of an aircraft including the aircraft seat.

In some embodiments, the space may be proximate to an aisle of an aircraft cabin including the aircraft seat. The space may be bounded at least in part by the aircraft seat and the aisle.

In some embodiments, the space may be enveloped by a curtain installed within the aircraft when the curtain is deployed.

In some embodiments, the body and the auxiliary aircraft accessory may be dimensioned to fit within the space enveloped by the curtain.

In some embodiments, the body, the auxiliary aircraft accessory, and at least a portion of the aircraft seat may be dimensioned to fit within the space enveloped by the curtain.

In some embodiments, the auxiliary aircraft accessory may include a bassinet.

An adapter plate for an aircraft seat is disclosed, in accordance with one or more embodiments of the disclosure. The adapter plate may include a body integrated within a portion of an aircraft seat. The body may be configured to share a plane with an armrest of the aircraft seat and a lower member of the aircraft seat. The body may include at least one mount point. The at least one mount point of the body may be configured to attach to at least one mount bracket of an auxiliary aircraft accessory. The auxiliary aircraft accessory may be positioned within a space proximate to the aircraft seat when coupled to the at least one mount point of the body via the at least one mount bracket.

In some embodiments, the body may further include a primary section and an auxiliary section. The primary section and the auxiliary section may be coupled together via one or more hinges.

In some embodiments, the primary section, the auxiliary section, the armrest, and the lower member may be configured to share the plane when the auxiliary section is deployed and the auxiliary aircraft accessory is coupled to the at least one mount point of the body via the at least one mount bracket.

In some embodiments, an exterior face of the auxiliary section may be configured to fold against an exterior face of the primary section via the one or more hinges when the auxiliary aircraft accessory is not coupled to the at least one mount point of the body via the at least one mount bracket.

In some embodiments, the primary section, the armrest, and the lower member may be configured to share the plane when the auxiliary aircraft accessory is not coupled to the at least one mount point of the body via the at least one mount bracket.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2A illustrates a plate adapter for an aircraft seat, in accordance with one or more embodiments of the disclosure;

DETAILED DESCRIPTION OF THE INVENTION

Figure 1A:
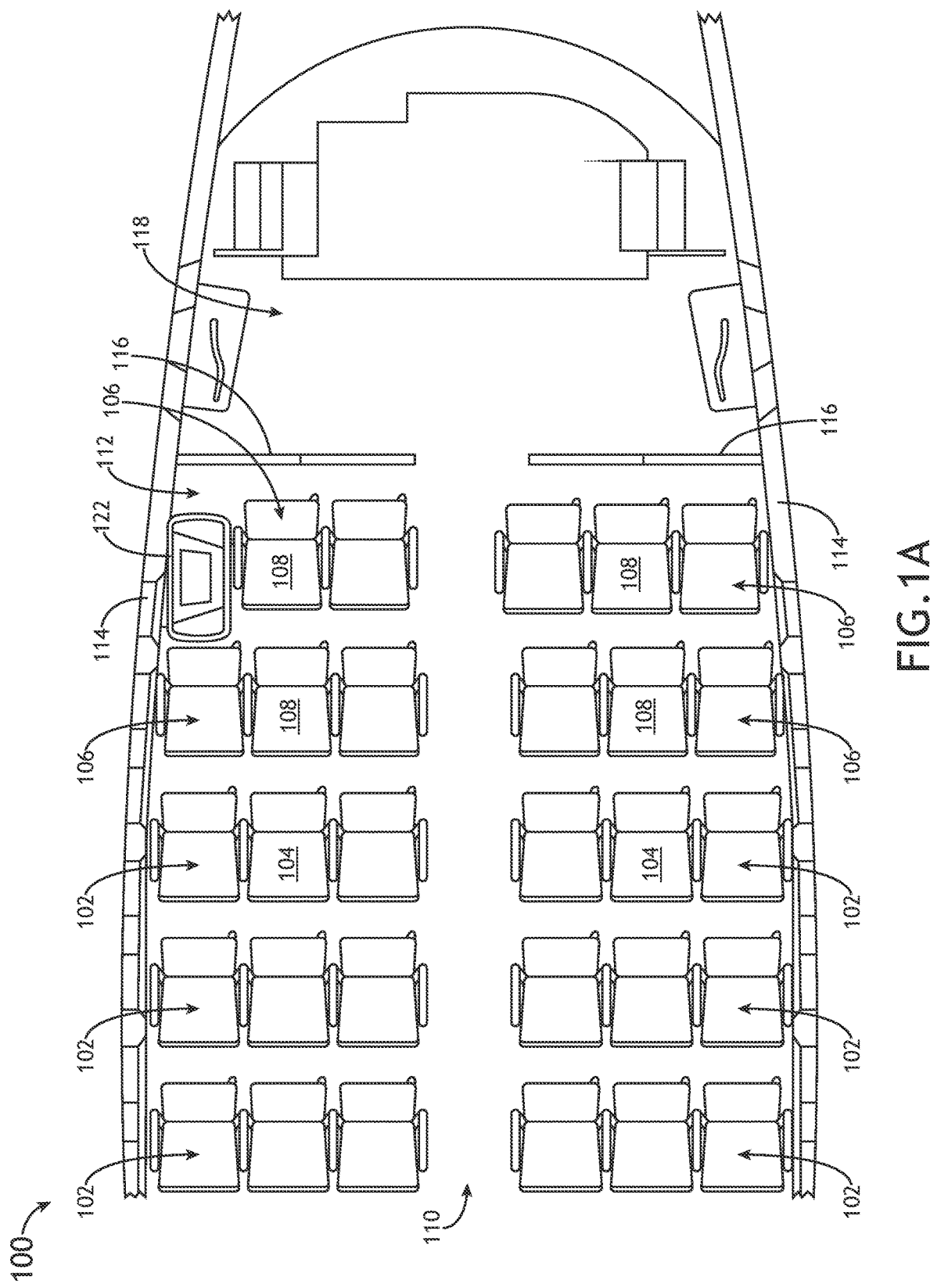
FIG. 1A illustrates an aircraft cabin including a plate adapter for an aircraft seat, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1A-5B generally illustrate a plate adapter for an aircraft seat, in accordance with one or more embodiments of the disclosure.

Select aircraft with a cabin including an aft tapered section may require one or more rows of triple seats with an increasingly-narrow width in order to not interfere with an aisle adjacent to the triple seats. The narrow width of the aft rows of triple seats may be undesired by passengers, who may not wish to be subject to the narrow width solely because they are seated in the aft of the aircraft cabin.

In addition, select aircraft include the capability for mounted auxiliary aircraft accessories including, but not limited to, bassinets. The bassinets are typically mounted up near the front of the aircraft and/or on a bulkhead or divider. Mounting the bassinets of the bulkhead or divider may allow for sound to carry through between the divider, potentially interfering with the environment of forward classes.

As such, it would be beneficial to provide a plate adapter for an aircraft seat that provides an additional and/or an alternative location to install an auxiliary aircraft accessory, for purposes of increasing space and/or re-locating the auxiliary aircraft accessory to another location in the aircraft cabin.

Figure 1B:
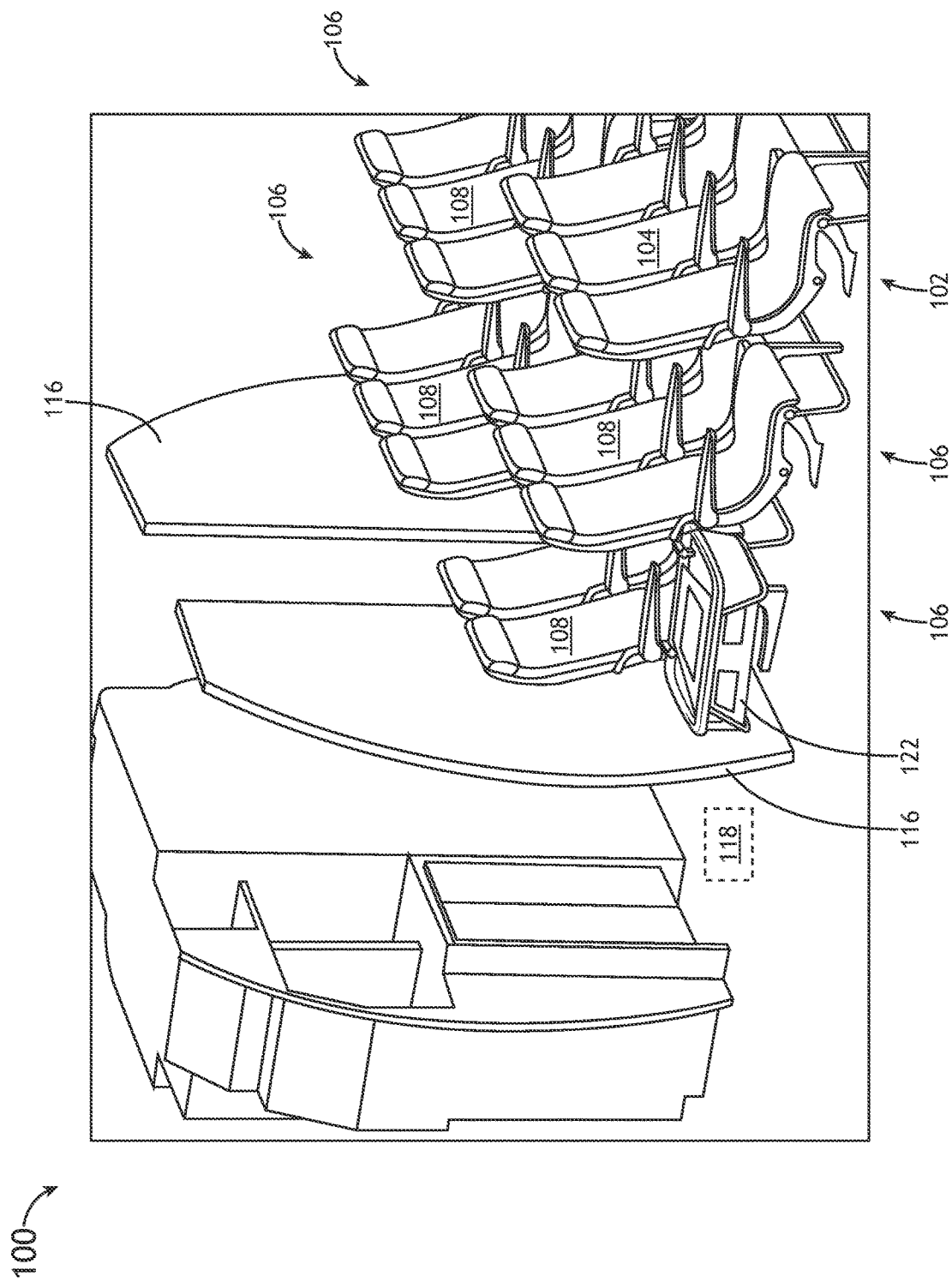
FIG. 1B illustrates an aircraft cabin including a plate adapter for an aircraft seat, in accordance with one or more embodiments of the disclosure.

FIGS. 1A and 1B generally illustrate an aircraft cabin 100, in accordance with one or more embodiments of the disclosure.

The aircraft cabin 100 may include one or more rows 102 of standard-width aircraft seats 104. The aircraft cabin 100 may include one or more rows 106 of narrow-width aircraft seats 108. The aircraft cabin 100 may include an aisle 110 between adjacent rows 102, 106.

The aircraft cabin 100 may include a space 112. The space 112 may be proximate to a row 102, 106 with aircraft seats 104, 108 respectively.

For example, as illustrated in at least FIGS. 1A and 1B, the aircraft cabin 100 may include a row 106 with two aircraft seats 108 and a space 112 proximate to a sidewall 114 of the fuselage. The space 112 may be bounded at least in part by one of more of a sidewall 114 of the fuselage, the one or more aircraft seats 104, 108, and/or a bulkhead or divider 116. The space 112 may be accessible via the footwell of the row 102 or 106 including the aircraft seat 104 or 108, respectively, to which the one or more auxiliary aircraft accessories 122 may be coupled. Where the bulkhead or divider 116 is not full-width (e.g., there is a gap near the sidewall 114 of the fuselage), the space 112 may be accessible via an aft section 118 (e.g., an auxiliary galley section, lavatory section, stowage section, or the like) of the aircraft cabin 100.

Figure 1C:
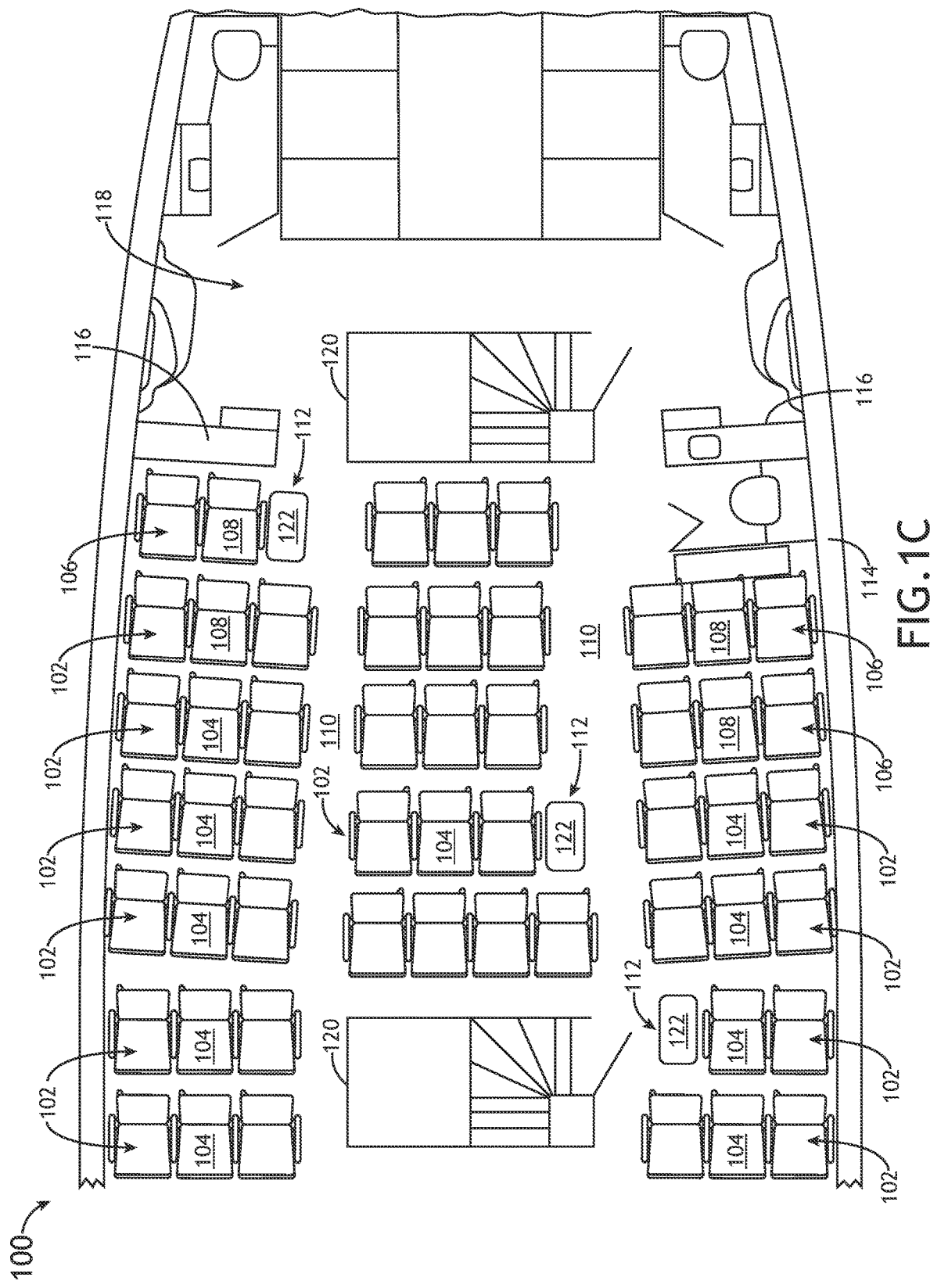
FIG. 1C illustrates an aircraft cabin including a plate adapter for an aircraft seat, in accordance with one or more embodiments of the disclosure.

By way of another example, as illustrated in at least FIG. 1C, the aircraft cabin 100 may include a row 106 with two aircraft seats 108 and a space 112 proximate to an aisle 110. For instance, the space 112 may be bounded at least in part by one or more aircraft seats 104,108, an aisle 110, and/or a bulkhead or divider 116.

By way of another example, as illustrated in at least FIG. 1C, the aircraft cabin 100 may include a row 102 with three seats 104 and a space 112 proximate to an aisle 110. The space 112 may be bounded at least in part by one or more aircraft seats 104, 108 and/or an aisle 110.

By way of another example, as illustrated in at least FIG. 1C, the aircraft cabin 100 may include a row 102 with two seats 104 and a space 112 proximate to an aisle 110 and a monument 120. The space 112 may be bounded at least in part by one or more aircraft seats 104, 108 and/or an aisle 110. It is noted herein the space 112 proximate to the aisle 110 may allow for increased access to a stowage compartment, a vestibule, a lavatory, or other structure within the aircraft cabin 110 (e.g., may allow for a doorway to open into the monument 120 to access a stowage compartment, a vestibule leading to stairs for crew quarters/first-class sleeping arrangements, or the like).

It is noted herein the aircraft cabin 100 may include multiple spaces 112.

The space 112 may be configured for stowage (e.g., passenger bags, crew member bags, wheelchairs, strollers, musical instruments, aircraft amenities, or the like).

The space 112 may be configured to contain one or more auxiliary aircraft accessories 122 coupled to the aircraft seats 104, 108. For example, the one or more auxiliary aircraft accessories 122 may include, but are not limited to, a bassinet, a tray table (e.g., a side table, an end table, a work table, or the like), a minibar, a stowage compartment, an electronic workstation, a courier compartment or lockbox, a cradle (e.g., for organ transport coolers), or the like.

Figure 2B:
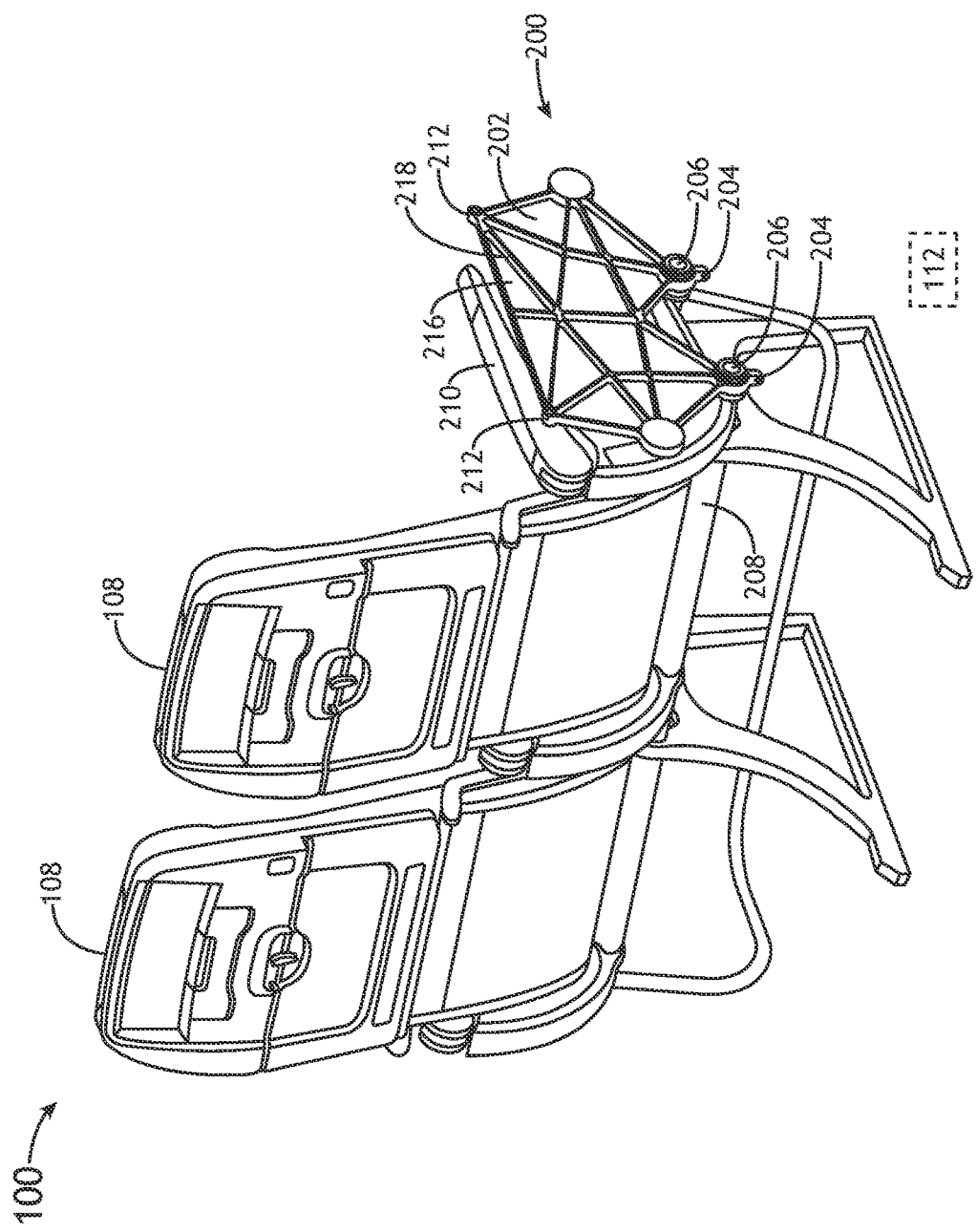
FIG. 2B illustrates an aircraft seat with a plate adapter, in accordance with one or more embodiments of the disclosure.
Figure 2C:
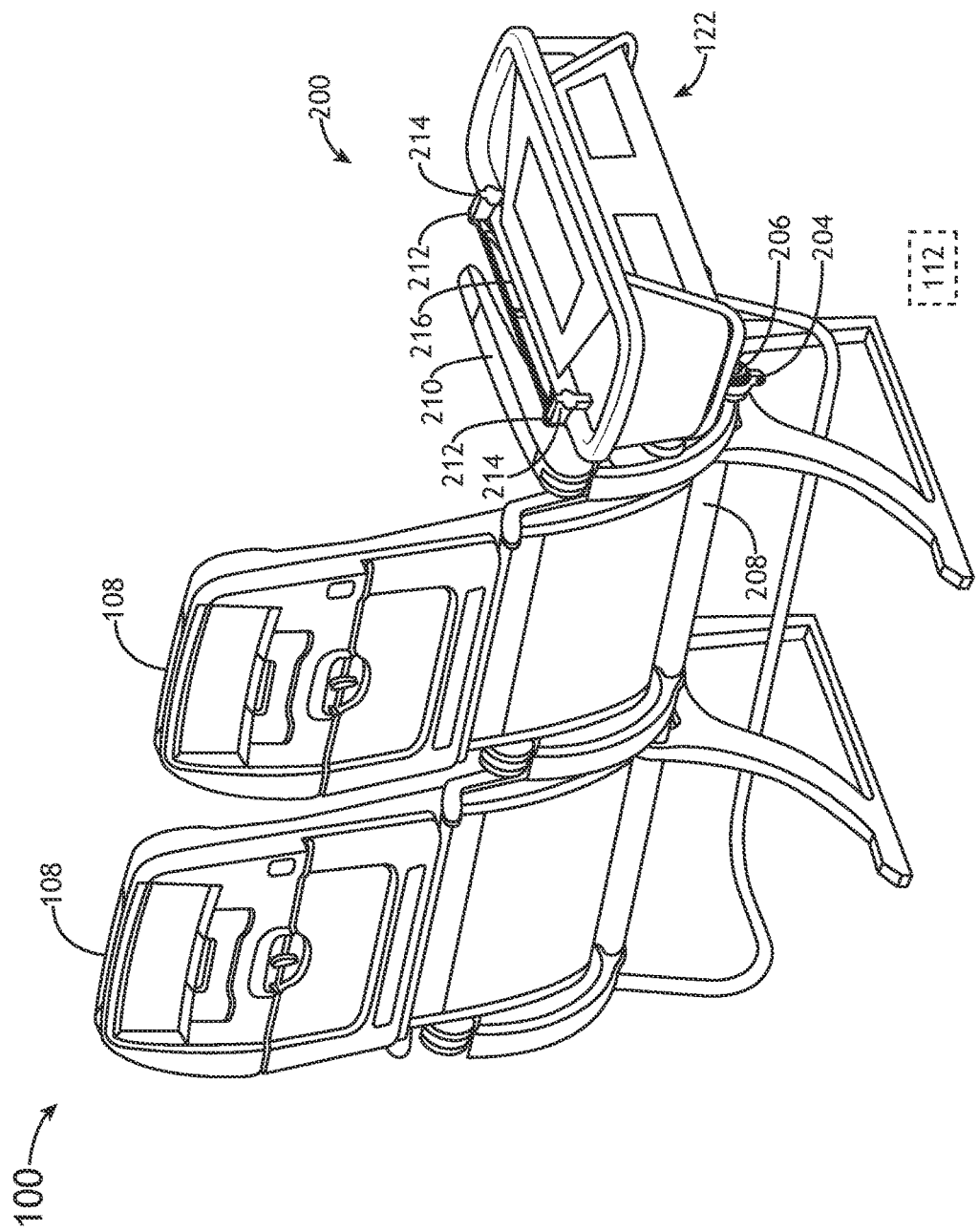
FIG. 2C illustrates a bassinet mounted to an aircraft seat via a plate adapter, in accordance with one or more embodiments of the disclosure.

FIG. 2A-2C generally illustrate an adapter plate 200, in accordance with one or more embodiments of the disclosure.

The adapter plate 200 may include a body 202. The body 202 may include one or more couplers 204. For example, as illustrated in at least FIG. 2B, the one or more couplers 204 may include one or more clamps configured to attach to one or more plugs 206. For instance, a particular plug 206 may be configured to be inserted into a corresponding spar tube 208 of the aircraft seat 108. By way of another example, the one or more couplers 204 may include one or more holes in the body 202, the one or more holes being threaded or non-threaded, the one or more holes configured to allow the body 202 to attach to the one or more plugs 206 (e.g., via one or more fasteners). In general, the one or more couplers 204 may attach to the one or more plugs 206 via a clamping mechanism (or device) (e.g., as illustrated in at least FIG. 2B), a non-clamping mechanism (or device) (e.g., an interlocking assembly, internal or external fasteners, an adhesive, or the like), and/or via internal or external forces (e.g., via friction).

It is noted herein the one or more couplers 204 may attach directly to a corresponding spar tube 208, such that the one or more plugs 206 may not be necessary. In addition, it is noted herein the one or more plugs 206 may be integrated into the design of the body 202, such that the one or more couplers 204 may not be necessary. Therefore, the above description should not be interpreted as a limitation on the present disclosure but merely an illustration.

The adapter plate 200 may be positioned proximate to an armrest 210 of the aircraft seat 108 within the space 112. For instance, the adapter plate 200 may be positioned exterior of the armrest 210 of the aircraft seat 108 within the space 112.

The body 202 may include one or more mount points 212. As illustrated in FIG. 2C, an auxiliary aircraft accessory 122 may include one or more mount brackets 214 configured to attach to the one or more mount points 212. For example, the one or more mount brackets 214 of the auxiliary aircraft accessory 122 may be permanently coupled to the aircraft seat 108 via the one or more mount points 212 of the adapter plate 200 (e.g., during installation of the adapter plate 200 within the aircraft cabin 100). By way of another example, the one or more mount brackets 214 of the auxiliary aircraft accessory 122 may be removably coupled to the aircraft seat 108 via the one or more mount points 212 of the adapter plate 200. For instance, a crew member may install or uninstall the auxiliary aircraft accessory 122 following a request from a passenger in the aircraft seat 108 during a flight. It is noted herein that removing the auxiliary aircraft accessory 122 and stowing it when not in use may open up the space 112 for other uses by the crew member and/or by the passenger in the aircraft seat 108 to which the adapter plate 200 is coupled.

At least a portion of an exterior face of the body 202 may include one or more cut-outs 216 resulting in one or more raised portions 218. For example, the one or more cut-outs 216 may pass through the body 202. By way of another example, the one or more cut-outs 216 may generate recessed surfaces within the exterior face of the body 202. It is noted herein the one or more cut-outs 216 may be provided for weight reduction of the adapter plate 200, while the one or more raised portions 218 may remain to provide additional structural stability (e.g., rigidity, load dispersion, or the like) for the adapter plate 200 when the auxiliary aircraft accessory 122 is coupled to the adapter plate 200.

FIG. 3A-3D generally illustrate an adapter plate 300, in accordance with one or more embodiments of the disclosure.

The adapter plate 300 may include a body 302. The body 302 may include one or more couplers 304. For example, as illustrated in at least FIG. 3A, the one or more couplers 304 may include one or more clamps configured to attach to one or more sections 306 of a spar tube 308 (e.g., a tapered section 306, a section 306 with a reduced diameter, or the like). By way of another example, the one or more couplers 304 may include one or more holes in the body 302, the one or more holes being threaded or non-threaded, the one or more holes configured to allow the body 302 to attach to the one or more sections 306 of the one or more spar tubes 308 (e.g., via one or more fasteners). In general, the one or more couplers 304 may attach to the one or more sections 306 of the one or more spar tubes 308 via a clamping mechanism (or device) (e.g., as illustrated in at least FIG. 3A), a non-clamping mechanism (or device) (e.g., an interlocking assembly, internal or external fasteners, an adhesive, or the like), and/or via internal or external forces (e.g., via friction).

The adapter plate 300 may be positioned proximate to an armrest 310 of the aircraft seat 108 within the space 112. For instance, the adapter plate 300 may be positioned exterior of the armrest 310 of the aircraft seat 108 within the space 112.

It is noted herein, however, that the one or more couplers 304 may be configured to attach to one or more plugs, where the one or more plugs may be configured to be inserted into a corresponding spar tube 308 of the aircraft seat 108. Therefore, the above description should not be interpreted as a limitation on the present disclosure but merely an illustration.

Figure 3A:
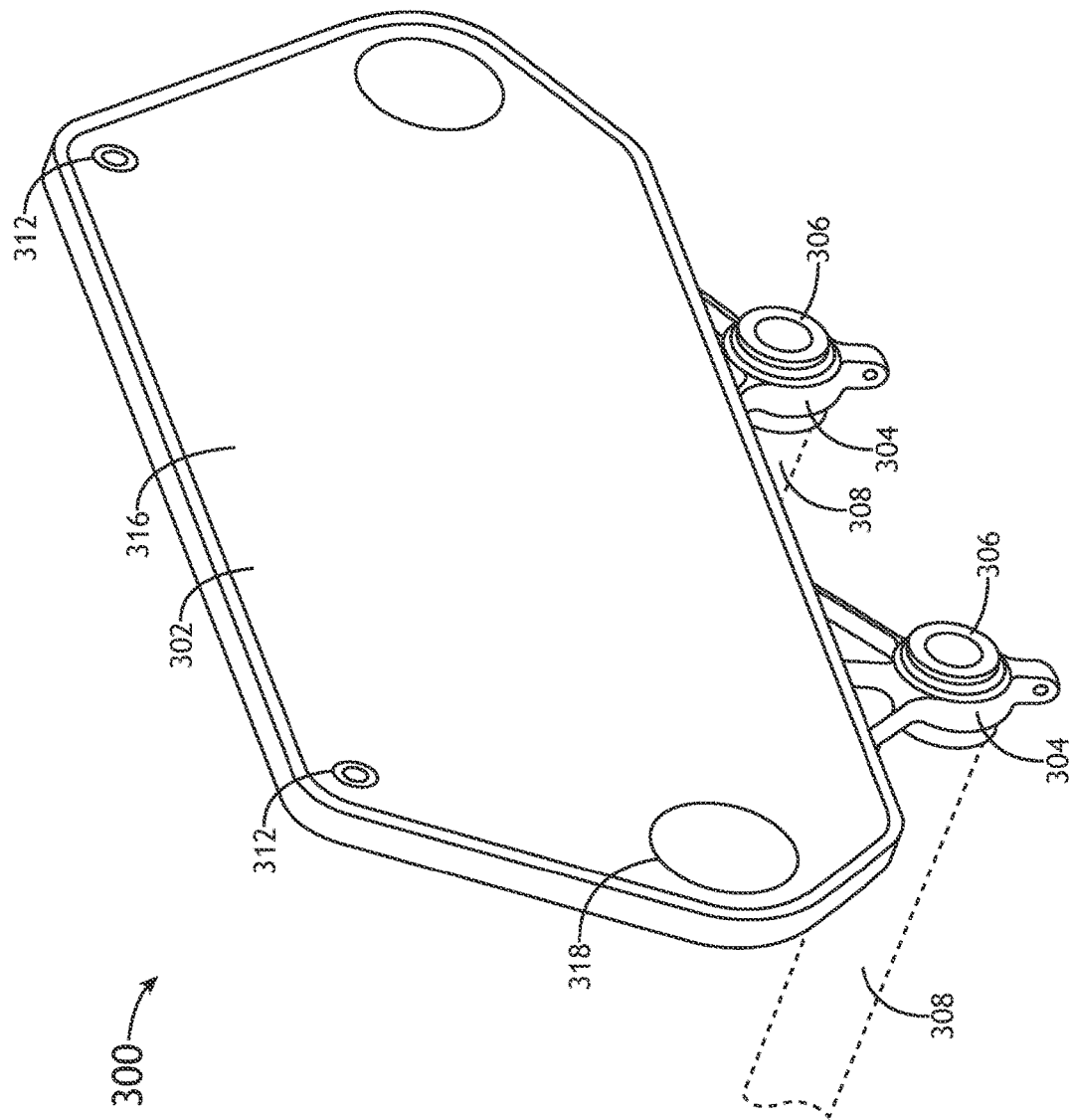
FIG. 3A illustrates a plate adapter for an aircraft seat, in accordance with one or more embodiments of the disclosure.
Figure 3B:
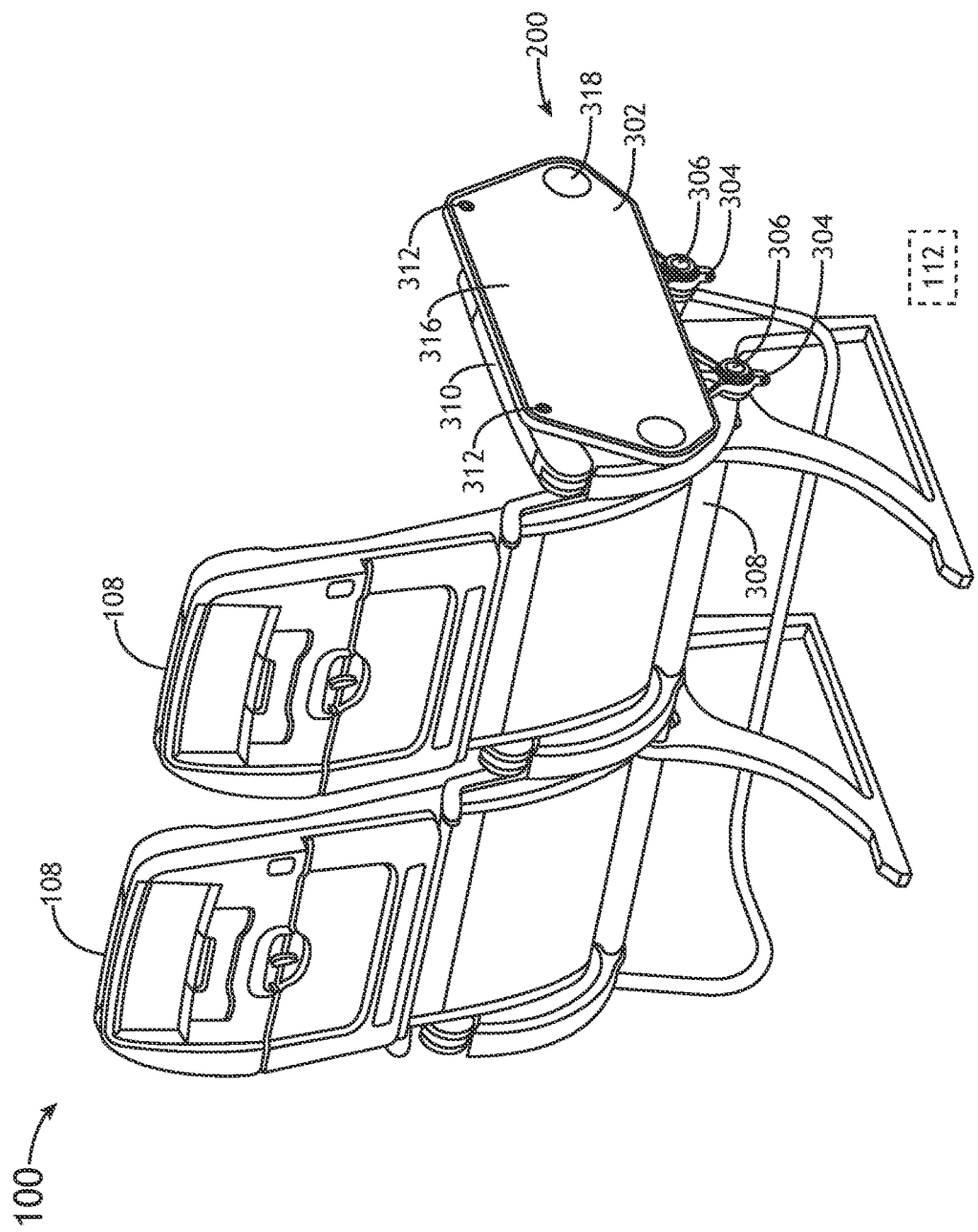
FIG. 3B illustrates an aircraft seat with a plate adapter, in accordance with one or more embodiments of the disclosure.
Figure 3C:
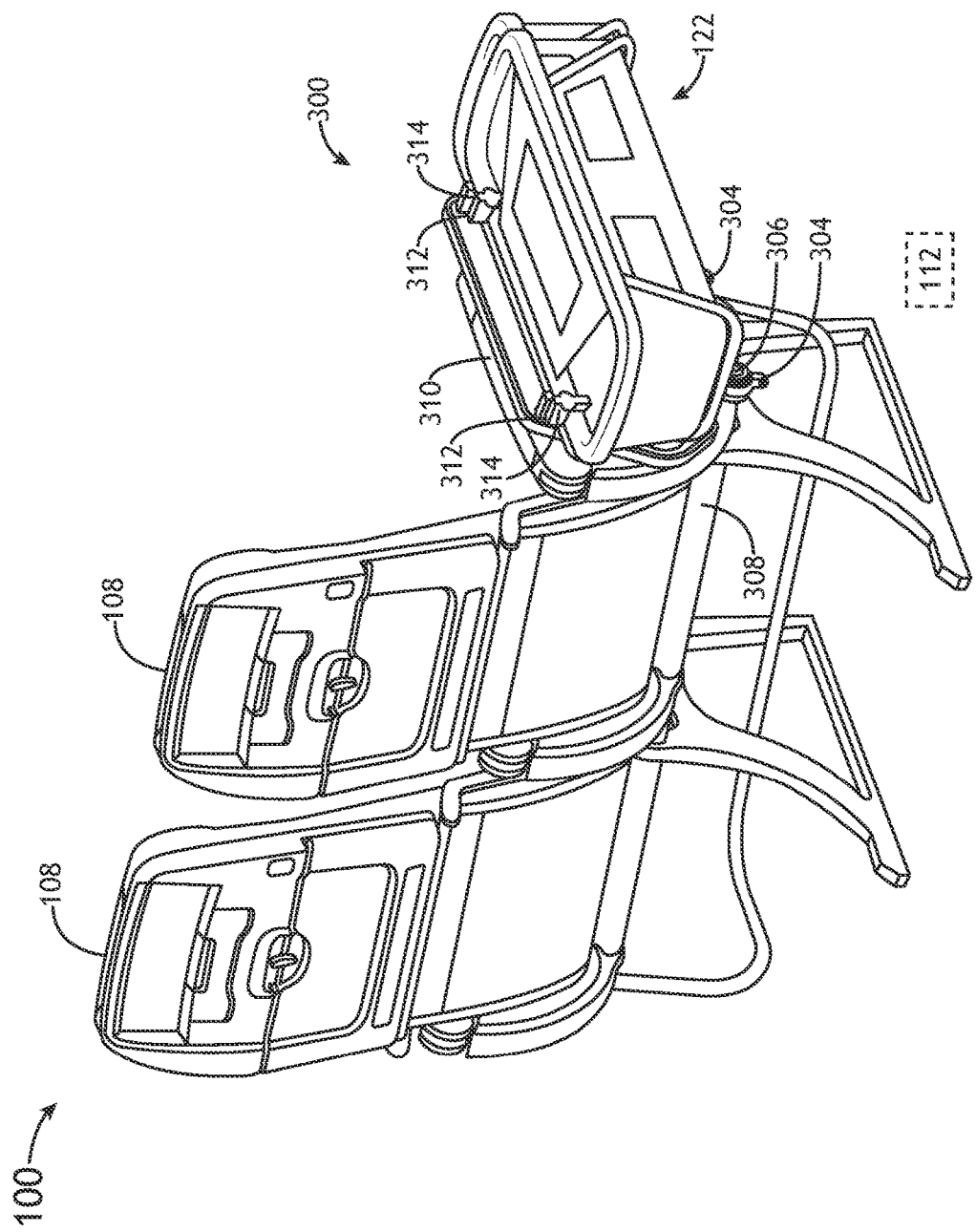
FIG. 3C illustrates a bassinet mounted to an aircraft seat via a plate adapter, in accordance with one or more embodiments of the disclosure.

The body 302 may include one or more mount points 312. As illustrated in FIG. 3C, an auxiliary aircraft accessory 122 may include one or more mount brackets 314 configured to attach to the one or more mount points 312. For example, the one or more mount brackets 314 of the auxiliary aircraft accessory 122 may be permanently coupled to the aircraft seat 108 via the one or more mount points 312 of the adapter plate 300 (e.g., during installation of the adapter plate 300 within the aircraft cabin 100). By way of another example, the one or more mount brackets 314 of the auxiliary aircraft accessory 122 may be removably coupled to the aircraft seat 108 via the one or more mount points 312 of the adapter plate 300. For instance, a crew member may install or uninstall the auxiliary aircraft accessory 122 following a request from a passenger in the aircraft seat 108 during a flight. It is noted herein that removing the auxiliary aircraft accessory 122 and stowing it when not in use may open up the space 112 for other uses by the crew member and/or by the passenger in the aircraft seat 108 to which the adapter plate 300 is coupled.

Figure 3D:
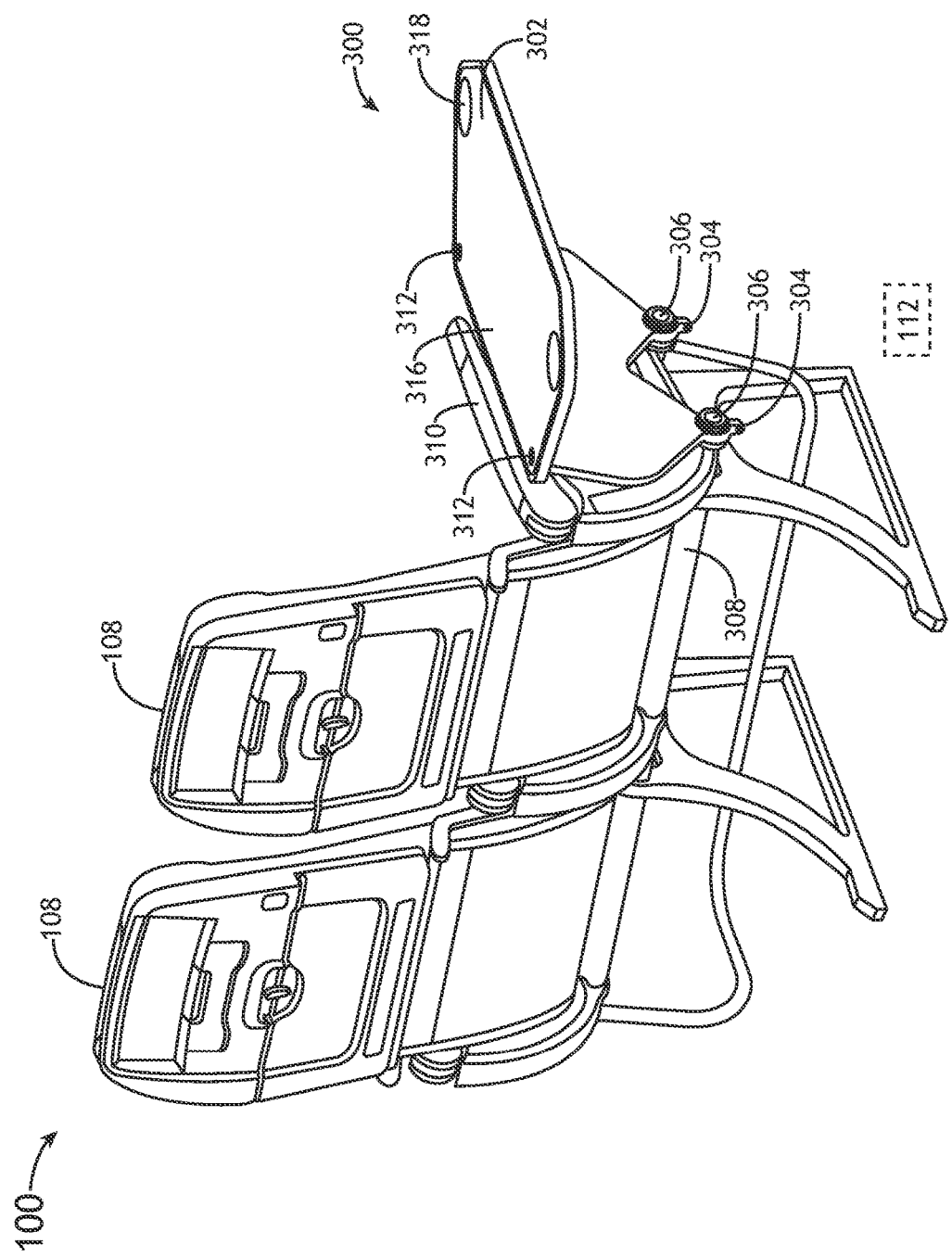
FIG. 3D illustrates a bassinet mounted to an aircraft seat via a plate adapter, in accordance with one or more embodiments of the disclosure.

The adapter plate 300 may include a smooth surface 316. For example, at least a portion of an exterior face of the body 302 may be smooth. As illustrated in FIG. 3D, the adapter plate 300 may include one or more components (e.g., linkages, frame members, joints, pivots, hinges, brackets, interlocking assemblies, or the like) necessary to convert the adapter plate 300 between a vertical or substantially vertical orientation and a horizontal or substantially horizontal orientation. The smooth surface 316 may include one or more indentations 318 (e.g., cupholders, or the like) for use when the adapter plate 300 is in the horizontal or substantially horizontal orientation. In this regard, the adapter plate 300 may be used as a primary or auxiliary tray table (e.g., a side table, an end table, a work table, or the like) when not coupled to an auxiliary aircraft accessory 122.

Although embodiments of the disclosure describe the tray table as being formed from the adapter plate 300 being converted into a horizontal surface, it is noted herein FIG. 3D may be understood as illustrating a removable tray table coupled to one or more mount points of an adapter plate via one or more mount brackets (e.g., versus the bassinet, as also illustrated through the disclosure). Therefore, the above description should not be interpreted as a limitation on the present disclosure but merely an illustration.

FIG. 4A-4F generally illustrate an integrated adapter plate 400, in accordance with one or more embodiments of the disclosure.

The integrated adapter plate 400 may include a body 402. The body 402 may include a primary section 404 and an auxiliary section 406 coupled together via one or more hinges 408.

The primary section 404 may be integrated within a portion of the aircraft seat 108. For example, the primary section 404, the armrest 410, and/or the lower member 412 may share a plane. By way of another example, the primary section 404, the auxiliary section 406, the armrest 410, and/or the lower member 412 may share a plane when the auxiliary section 406 is deployed.

Although embodiments of the disclosure illustrate the body 402 as including the primary section 404 and the auxiliary section 406 coupled together via the one or more hinges 408, it is noted herein the body 402 may be a single continuous piece. Therefore, the above description should not be interpreted as a limitation on the present disclosure but merely an illustration.

The body 402 may include one or more couplers 414. For example, as illustrated in at least FIG. 4A, the one or more couplers 414 may include one or more brackets configured to configured to attach to one or more plugs or spar tubes 416 of the aircraft seat 108. By way of another example, the one or more couplers 414 may include one or more holes in the body 202, the one or more holes being threaded or non-threaded, the one or more holes configured to allow the body 402 to attach to the one or more plugs or spar tubes 416 of the aircraft seat 108 (e.g., via one or more fasteners). In general, the one or more couplers 414 may attach to the one or more plugs 206 via a clamping mechanism (or device) (e.g., as illustrated in at least FIG. 4A), a non-clamping mechanism (or device) (e.g., an interlocking assembly, internal or external fasteners, an adhesive, or the like), and/or via internal or external forces (e.g., via friction).

The one or more couplers 414 may mount in addition or in the alternative to any location where the armrest 410 and/or the lower member 412 couples to the aircraft seat 108.

The body 402 may include one or more mount points 418. An auxiliary aircraft accessory 122 may include one or more mount brackets 420 configured to attach to the one or more mount points 418. For example, the one or more mount brackets 420 of the auxiliary aircraft accessory 122 may be permanently coupled to the aircraft seat 108 via the one or more mount points 418 of the adapter plate 400 (e.g., during installation of the adapter plate 400 within the aircraft cabin 100). By way of another example, the one or more mount brackets 420 of the auxiliary aircraft accessory 122 may be removably coupled to the aircraft seat 108 via the one or more mount points 418 of the adapter plate 400. For instance, a crew member may install or uninstall the auxiliary aircraft accessory 122 following a request from a passenger in the aircraft seat 108 during a flight. It is noted herein that removing the auxiliary aircraft accessory 122 and stowing it when not in use may open up the space 112 for other uses by the crew member and/or by the passenger in the aircraft seat 108 to which the adapter plate 400 is coupled.

Figure 4A:
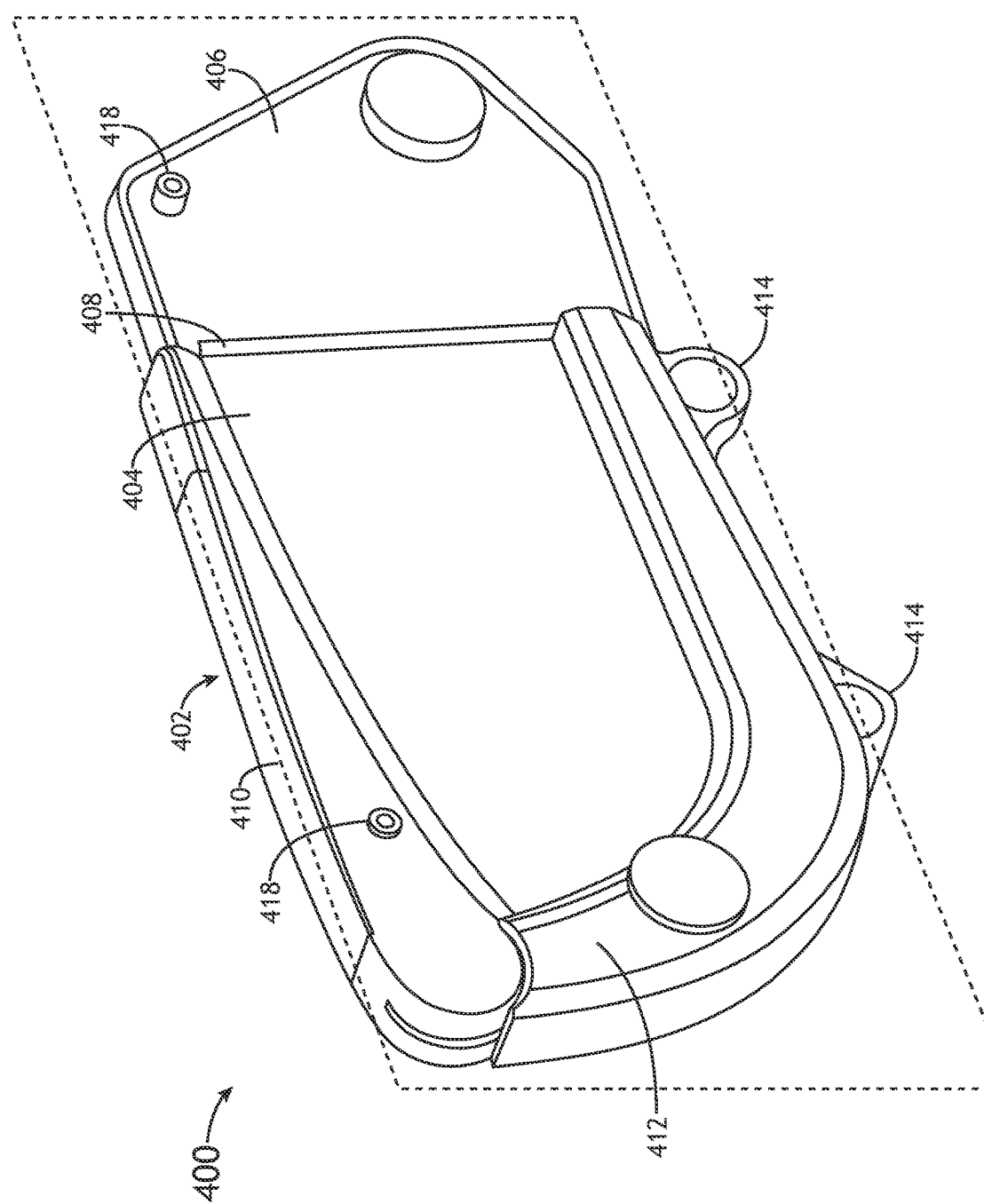
FIG. 4A illustrates an integrated plate adapter for an aircraft seat, in accordance with one or more embodiments of the disclosure.
Figure 4B:
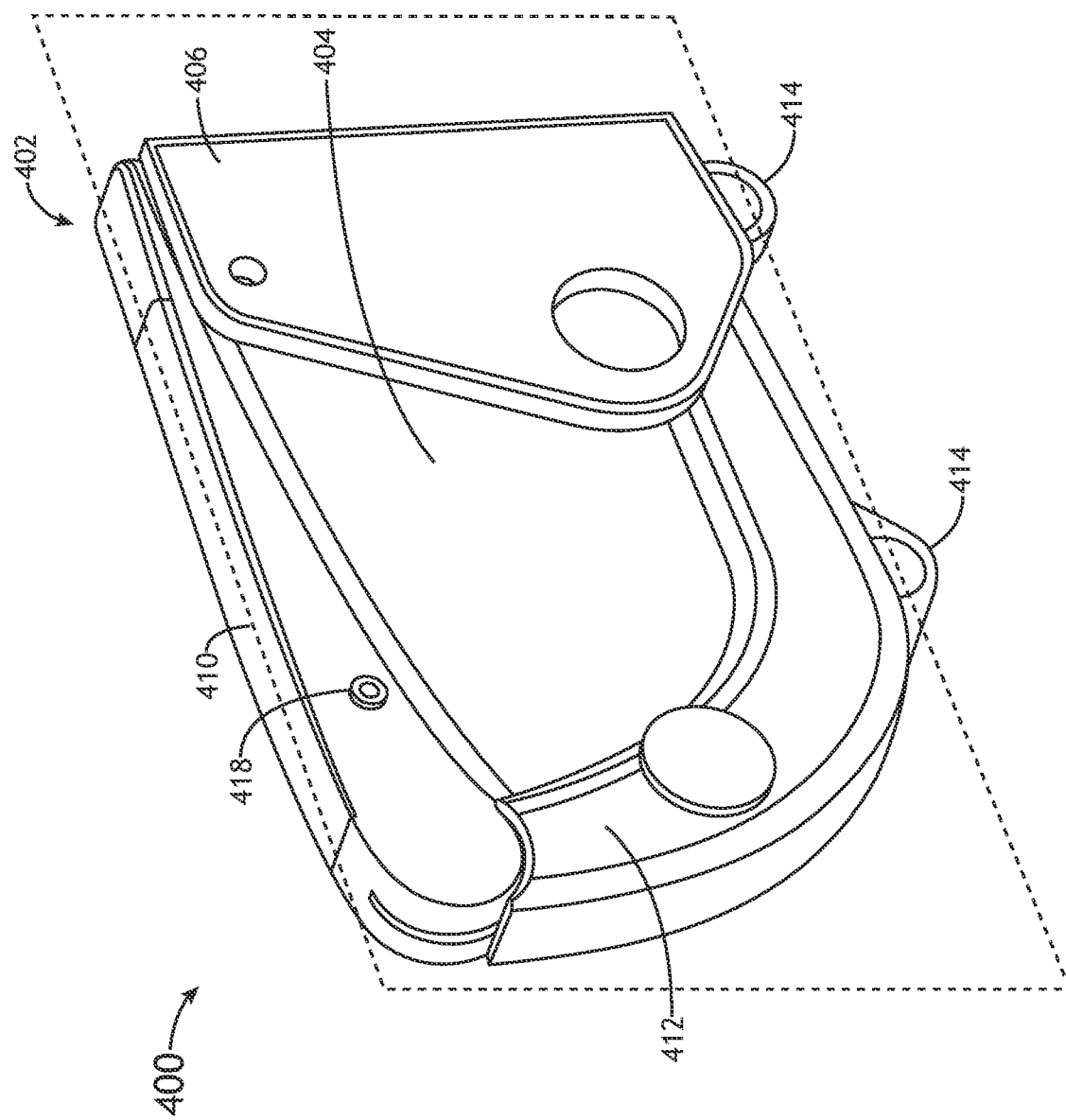
FIG. 4B illustrates an aircraft seat with an integrated plate adapter, in accordance with one or more embodiments of the disclosure.
Figure 4C:
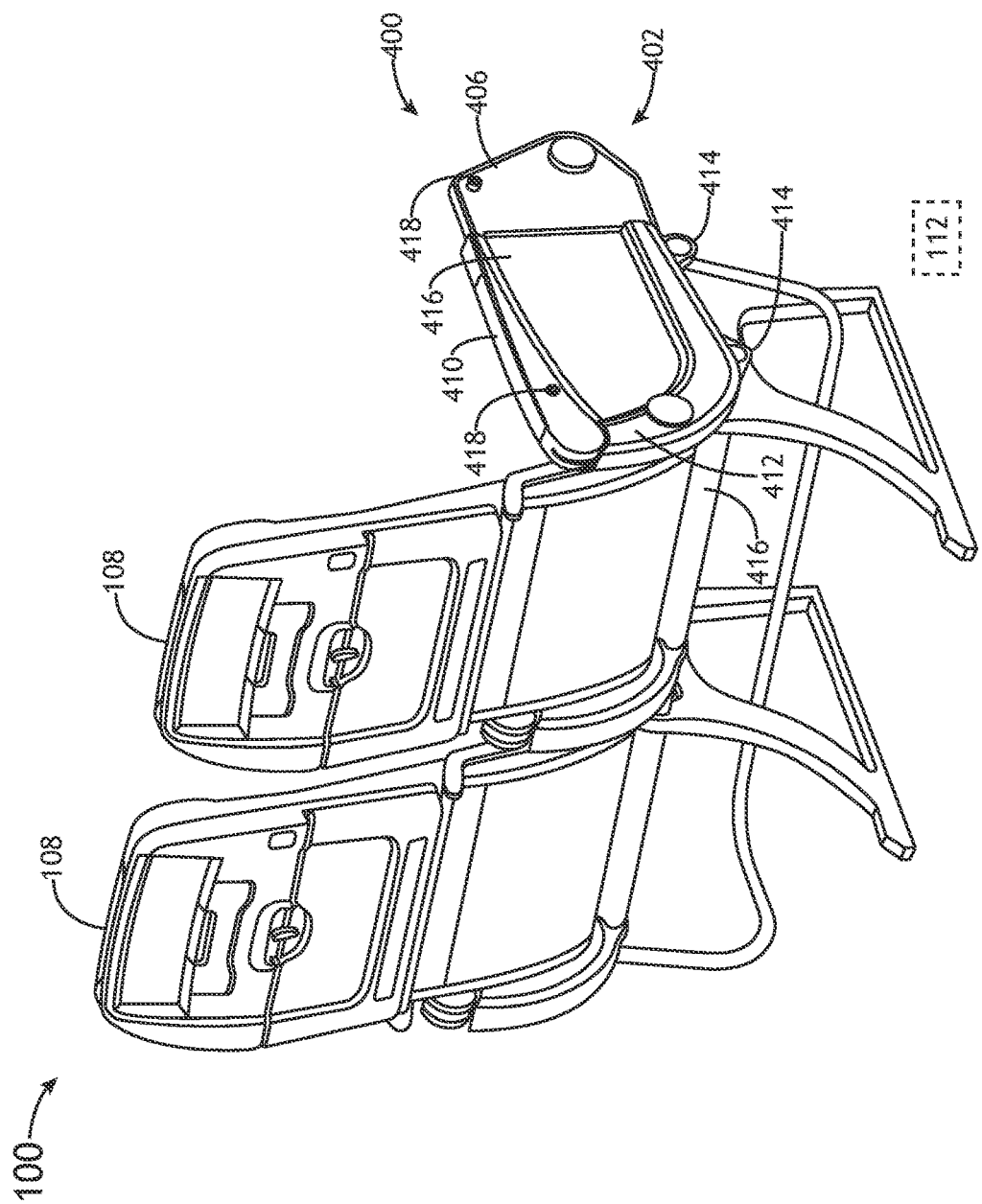
FIG. 4C illustrates an aircraft seat with an integrated plate adapter, in accordance with one or more embodiments of the disclosure.
Figure 4D:
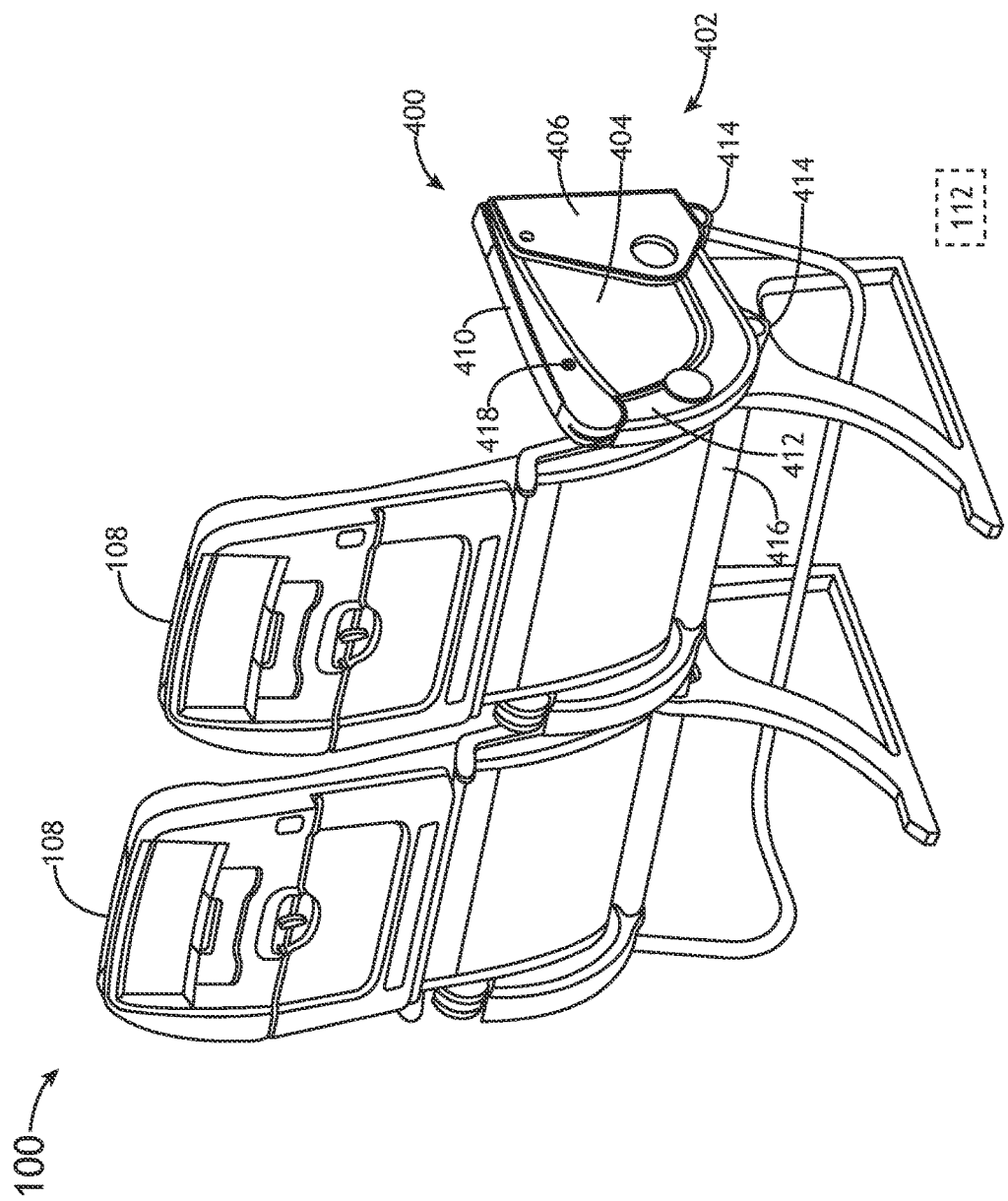
FIG. 4D illustrates an aircraft seat with an integrated plate adapter, in accordance with one or more embodiments of the disclosure.
Figure 4E:
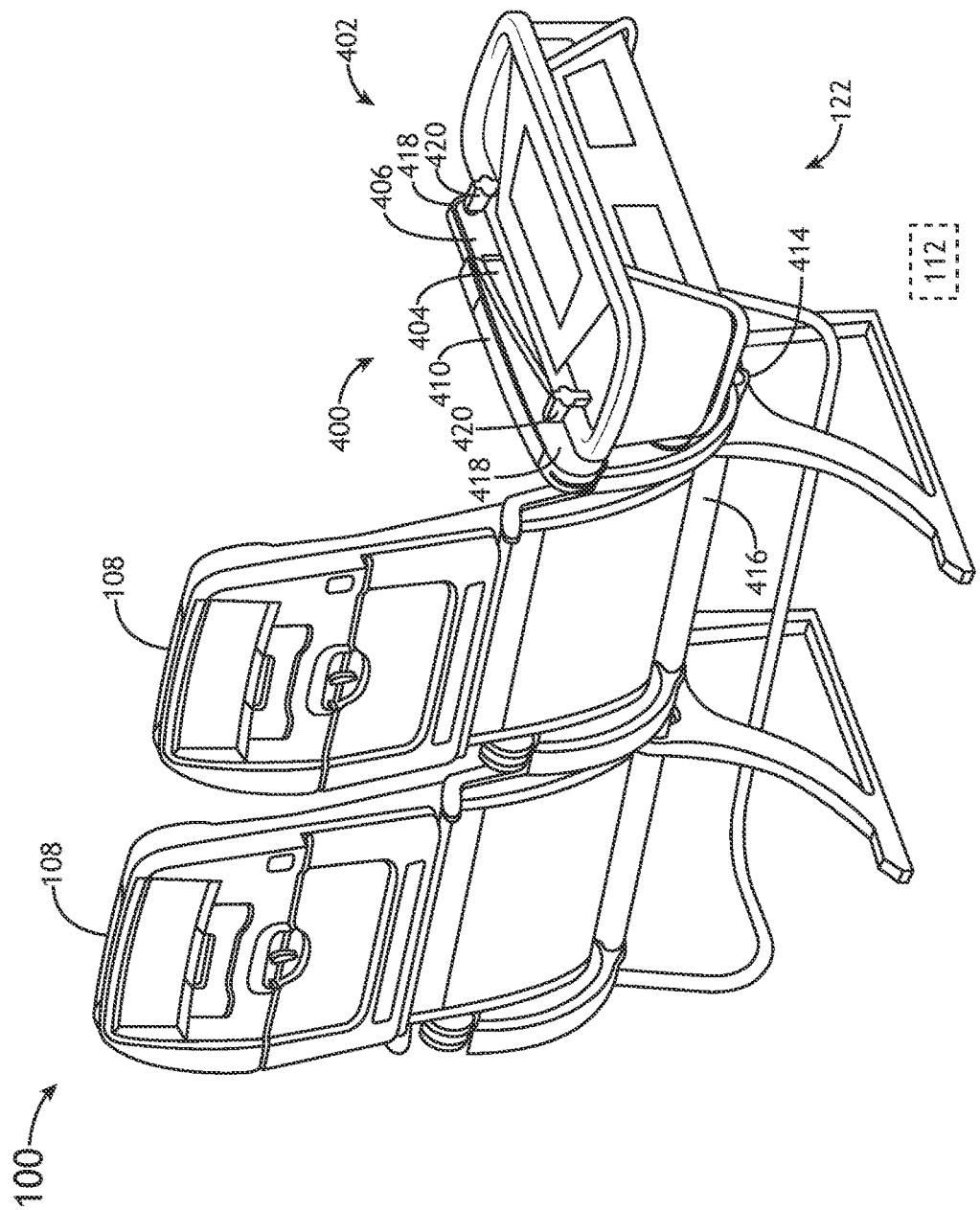
FIG. 4E illustrates a bassinet mounted to an aircraft seat via an integrated plate adapter, in accordance with one or more embodiments of the disclosure.
Figure 4F:
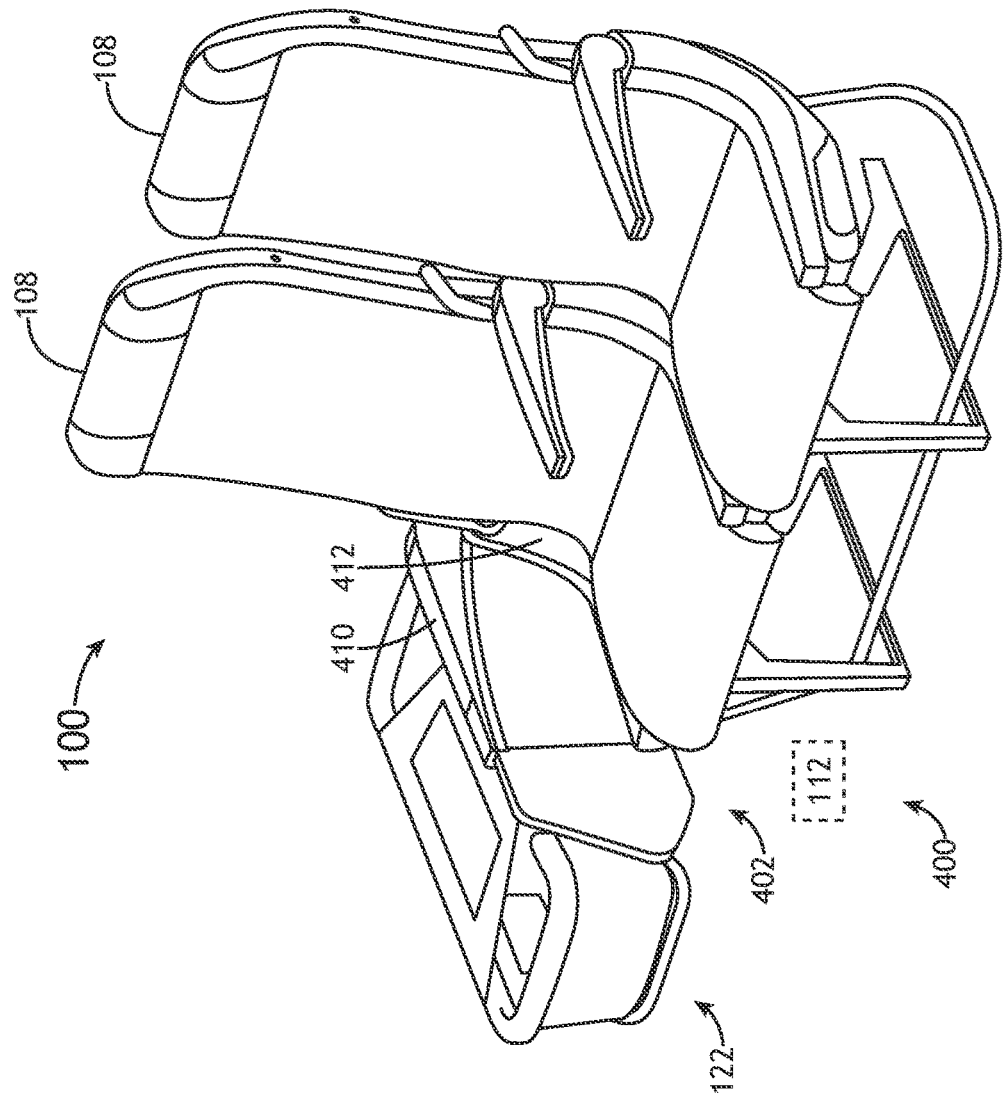
FIG. 4F illustrates a bassinet mounted to an aircraft seat via an integrated plate adapter, in accordance with one or more embodiments of the disclosure.

As illustrated in FIGS. 4A, 4C, 4E, and 4F, the auxiliary section 406 may be deployed when the integrated adapter plate 400 is in use (e.g., an auxiliary aircraft accessory 122 is coupled to the integrated adapter plate 400). As illustrated in FIGS. 4B and 4D, the auxiliary section 406 may be stowed against the primary section 404 (e.g., against an outer surface of the primary section 404) when the integrated adapter plate 400 is not in use (e.g., an auxiliary aircraft accessory 122 is not coupled to the integrated adapter plate 400). For example, an exterior face of the auxiliary section 406 may be configured to fold against an exterior face of the primary section 404 when the auxiliary aircraft accessory 122 is not coupled to the integrated adapter plate 400.

It is noted herein integrating the adapter plate 400 within the armrest 410 and/or the lower member 412 of the aircraft seat 108 may increase the space 112, to be used for additional stowage, seat width, aisle width, or the like. In addition, it is noted herein the stowing of the auxiliary section 406 may increase the space 112, to be used for additional stowage, seat width, aisle width, or the like.

It is noted herein that where the adapter plate 400 is used, the one or more rows 106 may include standard-width aircraft seats 104 as opposed to narrow-width aircraft seats 108, without adversely affecting the width of the aisle 108 beyond an encroachment (e.g., as allowed by aviation guidelines and/or standards). Therefore, the above description should not be interpreted as a limitation on the present disclosure but merely an illustration.

It is noted herein that any embodiment directed to the adapter plate 400 and/or the one or more components of the adapter plate 400 may be directed to the adapter plates 200, 300 and/or the one or more components of the adapter plates 200, 300 respectively. For example, the bodies 202, 302 of the adapter plates 200, 300 respectively may include a primary section and an auxiliary section coupled together via one or more hinges. Therefore, the above description should not be interpreted as a limitation on the present disclosure but merely an illustration.

It is noted herein that any embodiment directed to the adapter plate 200 and/or the one or more components of the adapter plate 200 may be directed to the adapter plates 300, 400 and/or the one or more components of the adapter plates 300, 400 respectively. Therefore, the above description should not be interpreted as a limitation on the present disclosure but merely an illustration.

It is noted herein that any embodiment directed to the adapter plate 300 and/or the one or more components of the adapter plate 300 may be directed to the adapter plates 200, 400 and/or the one or more components of the adapter plates 200, 400 respectively. Therefore, the above description should not be interpreted as a limitation on the present disclosure but merely an illustration.

Figure 5A:
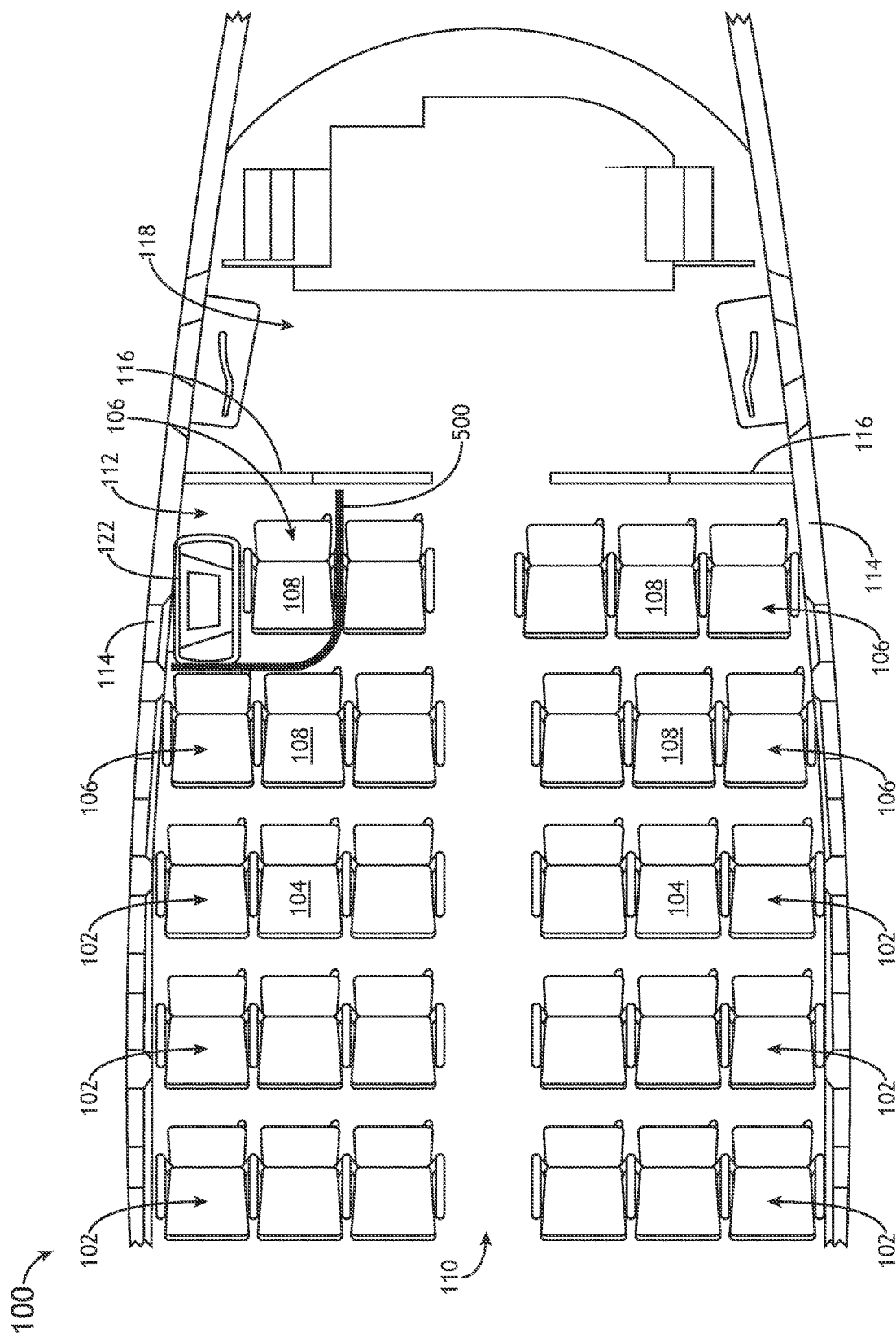
FIG. 5A illustrates an aircraft cabin including a plate adapter for an aircraft seat, in accordance with one or more embodiments of the disclosure.
Figure 5B:
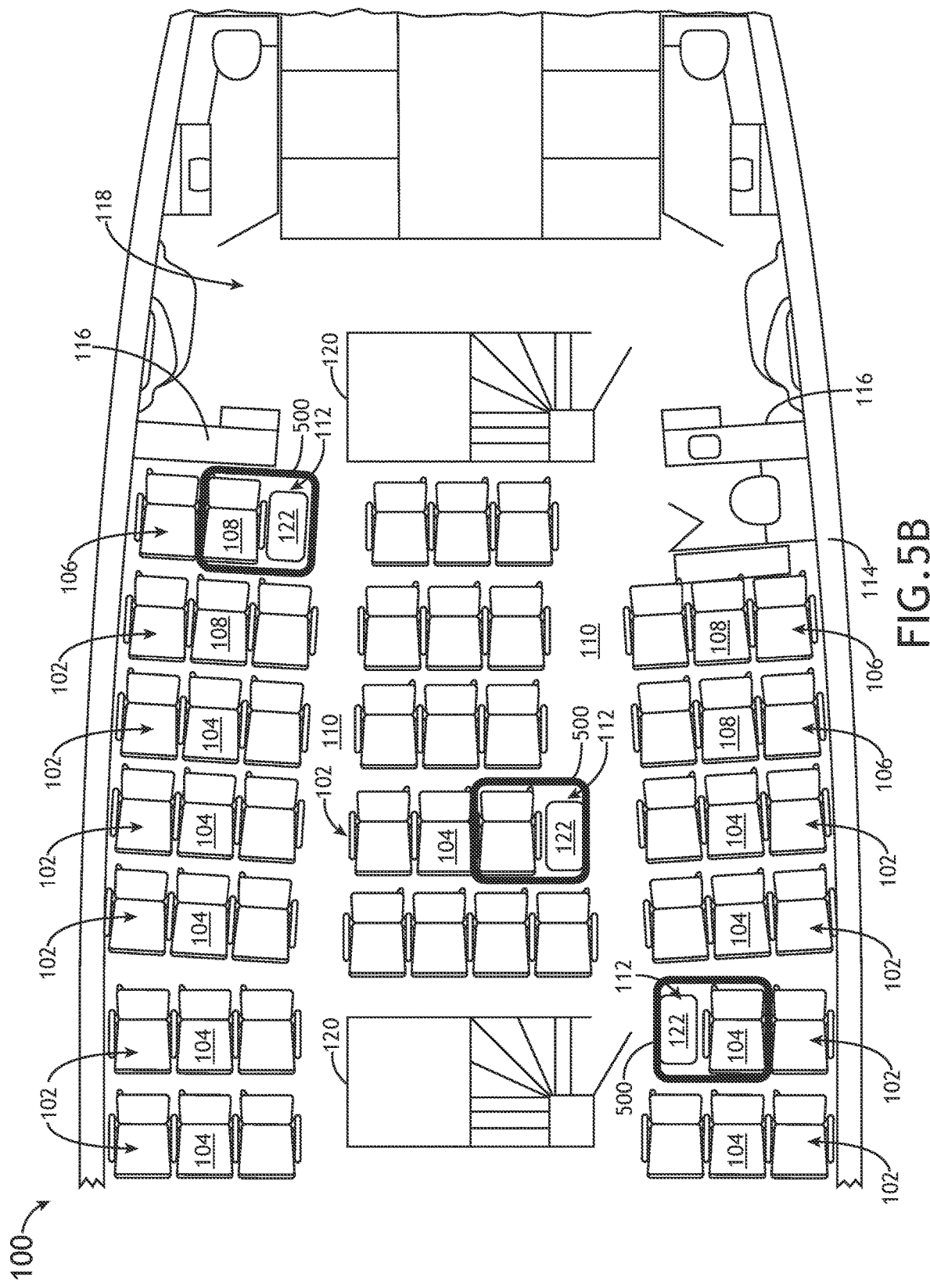
FIG. 5B illustrates an aircraft cabin including a plate adapter for an aircraft seat, in accordance with one or more embodiments of the disclosure.

FIGS. 5A and 5B generally illustrate the aircraft cabin 100, in accordance with one or more embodiments of the disclosure.

The aircraft cabin 100 may include a curtain 500. The adapter plates 200, 300, 400 may be dimensioned to fit within a space contained within the curtain 500 when the curtain 500 is deployed. For example, the curtain 500 may envelop the space 112 including the adapter plates 200, 300, 400 and the auxiliary aircraft accessory 122 when deployed. By way of another example, the curtain 500 may envelop the space 112 including the adapter plates 200, 300, 400, the auxiliary aircraft accessory 122, and at least a portion of the aircraft seat 108 when deployed.

The curtain 500 may be permanently installed on a rail, bar, rod, or the like (e.g., during installation within the aircraft cabin 100). For example, the curtain 500 may be stowed against the sidewall 114 of the fuselage. By way of another example, the curtain 500 may be stowed in or proximate to one or more overhead compartments of the aircraft cabin 100.

The curtain 500 may be removably coupled within the aircraft cabin 100. For example, the curtain 500 may be removably coupled to a rail, bar, rod, or the like (e.g., via a hook, slider, or the like coupled to the curtain 500). By way of another example, the curtain 500 may include one or more components of an interlocking assembly (e.g., an eyelet, a snap, a tab, or the like), the one or more components configured to attach to one or more corresponding components of an interlocking assembly within the aircraft cabin 100 (e.g., a receiving hook, a snap, a groove, or the like). A crew member may install or uninstall the curtain 500 following a request from a passenger in the aircraft seat 108 during a flight. It is noted herein that removing the curtain 500 and stowing it when not in use may open up the space 112 for other uses by the crew member and/or by the passenger in the aircraft seat 108 to which the adapter plates 200, 300, 400 are coupled.

In this regard, the adapter plates 200, 300, 400 may provide for an additional and/or alternative location to install an auxiliary aircraft accessory 122. For example, where the auxiliary aircraft accessory 122 is a bassinet, the adapter plates 200, 300, 400 may allow for the installation of the bassinet at a location other than on a bulkhead or divider. By way of another example, the adapter plates 200, 300, 400 coupling of the bassinet to the aircraft seat 108 may allow for increased privacy and/or may allow for a more complete and comfortable nursing station with the use of the curtain 500. In addition, installing an auxiliary aircraft accessory 122 near the narrower-width aircraft seats 108 may make the narrower-width aircraft seats 108 more desirable to a passenger.

Although embodiments of the present disclosure are directed to the interaction of adapter plates 200, 300, 400 with the aircraft seat 108, it is noted herein that any embodiments may be directed to the interaction of adapter plates 200, 300, 400 with the aircraft seat 104. Therefore, the above description should not be interpreted as a limitation on the present disclosure but merely an illustration.

Where the adapter plates 200, 300, 400 are installed in an aircraft cabin 100, it is noted herein the adapter plates 200, 300, 400 may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Although embodiments of the disclosure are directed to an aircraft cabin 100, it is noted herein the adapter plates 200, 300, 400 may be used in any avionics environment. In addition, although embodiments of the disclosure are directed to an avionics environment, it is noted herein the adapter plates 200, 300, 400 are not limited to the avionics environment and/or the aircraft components within the avionics environment. For example, the adapter plates 200, 300, 400 may be configured to operate in any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. By way of another example, the adapter plates 200, 300, 400 may be coupled to and/or configured to operate with apparatus sold for commercial or industrial use in either a home or a business. Therefore, the above description should not be interpreted as a limitation on the present disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft seat assembly comprising:
   an aircraft seat including an armrest and at least one spar tube;
   a bassinet including at least one mount bracket; and
   an adapter plate for the aircraft seat, comprising:
   a body configured to be positioned exterior of the armrest within a space proximate to the aircraft seat, the body comprising:
   at least one coupler configured to attach to the at least one spar tube of the aircraft seat; and
   at least one mount point, the at least one mount point of the body configured to attach to the at least one mount bracket of the bassinet, the bassinet positioned within a space proximate to the aircraft seat when coupled to the at least one mount point of the body via the at least one mount bracket.

2. The aircraft seat assembly of claim 1, the at least one coupler configured to attach to at least one plug, the at least one plug configured to be inserted into the at least one spar tube of the aircraft seat.

3. The aircraft seat assembly of claim 1, at least a portion of an exterior face of the body including one or more cut-outs and one or more raised sections.

4. The aircraft seat assembly of claim 1, at least a portion of an exterior face of the body being smooth and including an indentation.

5. The aircraft seat assembly of claim 4, wherein the exterior face of the body is in a substantially vertical orientation when the bassinet is coupled to the at least one mount point; wherein the exterior face of the body is configured to convert to a substantially horizontal orientation when the bassinet is not coupled to the at least one mount point; wherein the indentation is a cupholder when the exterior face is in the substantially horizontal orientation.

6. The aircraft seat assembly of claim 1, the space bounded at least in part by the aircraft seat and a sidewall of an aircraft fuselage of an aircraft including the aircraft seat.

7. The aircraft seat assembly of claim 1, the space being proximate to an aisle of an aircraft cabin including the aircraft seat, the space bounded at least in part by the aircraft seat and the aisle.

8. The aircraft seat assembly of claim 1, the space enveloped by a curtain installed within the aircraft when the curtain is deployed.

9. The aircraft seat assembly of claim 8, the body and the bassinet dimensioned to fit within the space enveloped by the curtain.

10. The aircraft seat assembly of claim 8, the body, the bassinet, and at least a portion of the aircraft seat being dimensioned to fit within the space enveloped by the curtain.

\* \* \* \* \*